US007911328B2

(12) United States Patent
Luden et al.

(10) Patent No.: US 7,911,328 B2
(45) Date of Patent: Mar. 22, 2011

(54) CAPTURE AND REMOTE REPRODUCTION OF HAPTIC EVENTS IN SYNCHRONOUS ASSOCIATION WITH THE VIDEO AND AUDIO CAPTURE AND REPRODUCTION OF THOSE EVENTS

(75) Inventors: Mark A. Luden, Westerville, OH (US); Marvin L. Clamme, Westerville, OH (US); Kenneth J. McCaw, Westerville, OH (US)

(73) Assignee: The Guitammer Company, Westerville, OH (US)

( * ) Notice: Subject to any disclaimer, the term of this patent is extended or adjusted under 35 U.S.C. 154(b) by 383 days.

(21) Appl. No.: 12/275,767

(22) Filed: Nov. 21, 2008

(65) Prior Publication Data

US 2009/0128306 A1 May 21, 2009

Related U.S. Application Data

(60) Provisional application No. 61/055,291, filed on May 22, 2008, provisional application No. 60/989,632, filed on Nov. 21, 2007.

(51) Int. Cl.
*H04B 3/36* (2006.01)

(52) U.S. Cl. ........................ 340/407.1; 310/37; 434/114

(58) Field of Classification Search ............... 340/407.1; 310/36, 37; 434/114
See application file for complete search history.

(56) References Cited

U.S. PATENT DOCUMENTS

| | | | | |
|---|---|---|---|---|
| 5,388,992 | A | 2/1995 | Franklin et al. | |
| 5,838,808 | A * | 11/1998 | Prosser | 381/388 |
| 6,665,985 | B1 * | 12/2003 | Hennes | 52/7 |
| 7,493,365 | B2 * | 2/2009 | Wies et al. | 709/204 |
| 7,623,114 | B2 * | 11/2009 | Rank | 345/156 |
| 7,867,085 | B2 * | 1/2011 | Pryzby et al. | 463/30 |
| 2007/0001494 | A1 * | 1/2007 | Hoover | 297/217.4 |
| 2008/0223627 | A1 * | 9/2008 | Lacroix et al. | 178/18.01 |
| 2009/0132925 | A1 * | 5/2009 | Koehler et al. | 715/730 |

* cited by examiner

*Primary Examiner* — Eric M Blount

(74) *Attorney, Agent, or Firm* — Frank H. Foster; Kremblas & Foster

(57) ABSTRACT

Method and apparatus for reproducing and applying reproductions of haptic vibrations that occur at a live activity to a remote video and audio viewer. In synchronism with sensing visible and audible stimuli to generate video and audio signals representing the video and audio at the activity, haptic vibrations of an object at the activity are sensed and converted to haptic vibration signals. A haptic vibration signal that is a reproduction of the sensed signal, a simulation of the haptic vibration, or an enhancement of the sensed haptic vibration signal is transmitted to a remote location or recorded. The haptic vibration signal contains information about the timing and characteristic of the sensed haptic vibrations and is recoverable separately from the visible and audible signals. At a location that is remote from the activity, that information is detected and used to generate and apply a reproduction of the sensed haptic vibration signal, in synchronism with reproduction of the sensed video signal and of the sensed audio signal, to an electromechanical transducer that is mechanically connected to a solid object in physical contact with a remote viewer.

38 Claims, 5 Drawing Sheets

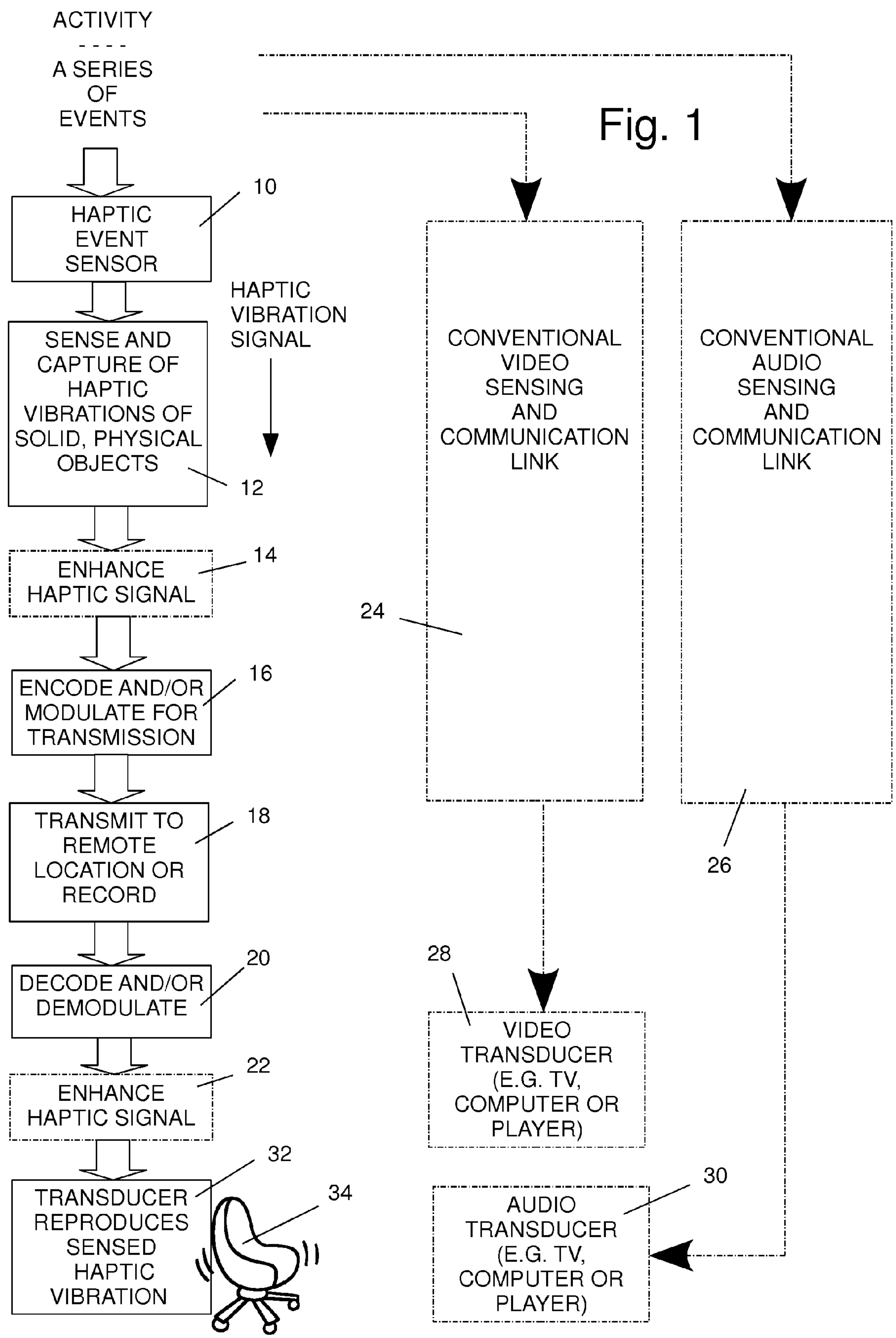
ACTIVITY
- - - -
A SERIES OF EVENTS
Fig. 1
10
HAPTIC EVENT SENSOR
HAPTIC VIBRATION SIGNAL
SENSE AND CAPTURE OF HAPTIC VIBRATIONS OF SOLID, PHYSICAL OBJECTS
12
ENHANCE HAPTIC SIGNAL
14
ENCODE AND/OR MODULATE FOR TRANSMISSION
16
TRANSMIT TO REMOTE LOCATION OR RECORD
18
DECODE AND/OR DEMODULATE
20
ENHANCE HAPTIC SIGNAL
22
TRANSDUCER REPRODUCES SENSED HAPTIC VIBRATION
32
34
CONVENTIONAL VIDEO SENSING AND COMMUNICATION LINK
24
CONVENTIONAL AUDIO SENSING AND COMMUNICATION LINK
26
28
VIDEO TRANSDUCER (E.G. TV, COMPUTER OR PLAYER)
30
AUDIO TRANSDUCER (E.G. TV, COMPUTER OR PLAYER)

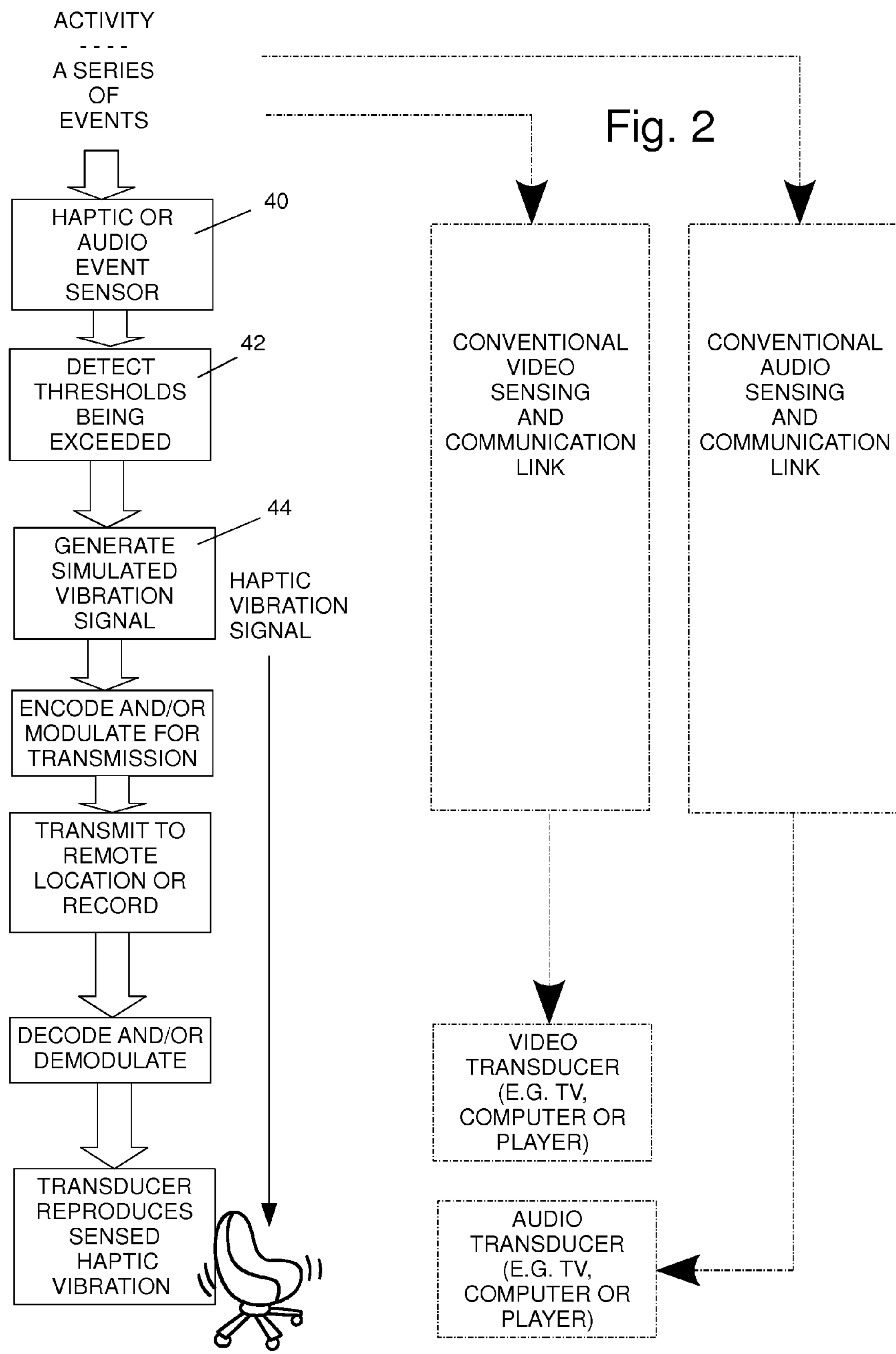
ACTIVITY
- - - -
A SERIES OF EVENTS
Fig. 2
HAPTIC OR AUDIO EVENT SENSOR
40
DETECT THRESHOLDS BEING EXCEEDED
42
GENERATE SIMULATED VIBRATION SIGNAL
44
HAPTIC VIBRATION SIGNAL
ENCODE AND/OR MODULATE FOR TRANSMISSION
TRANSMIT TO REMOTE LOCATION OR RECORD
DECODE AND/OR DEMODULATE
TRANSDUCER REPRODUCES SENSED HAPTIC VIBRATION
CONVENTIONAL VIDEO SENSING AND COMMUNICATION LINK
CONVENTIONAL AUDIO SENSING AND COMMUNICATION LINK
VIDEO TRANSDUCER (E.G. TV, COMPUTER OR PLAYER)
AUDIO TRANSDUCER (E.G. TV, COMPUTER OR PLAYER)

$T_2$
$T_1$

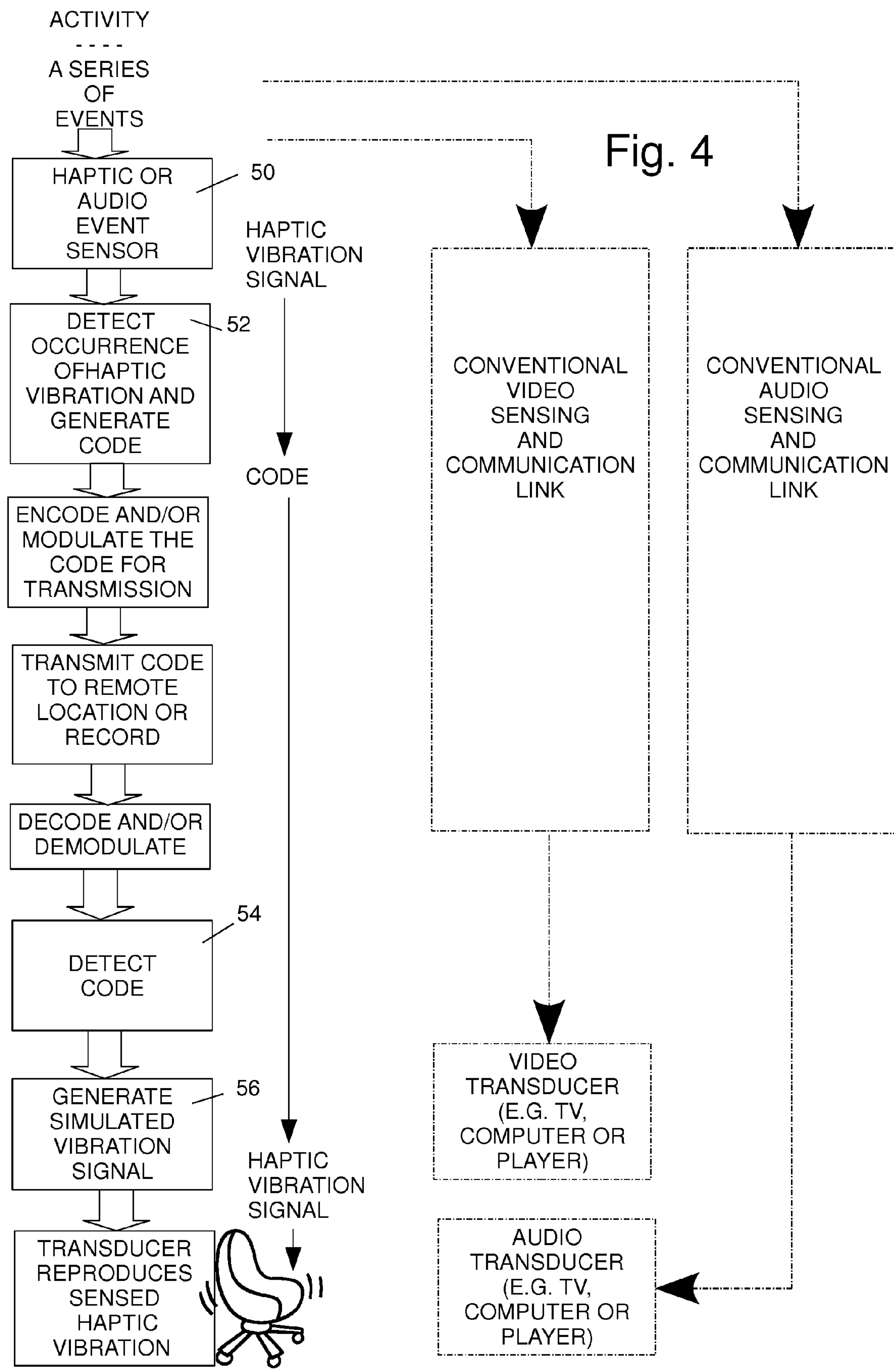
ACTIVITY
- - - -
A SERIES OF EVENTS
Fig. 4
HAPTIC OR AUDIO EVENT SENSOR
50
HAPTIC VIBRATION SIGNAL
DETECT OCCURRENCE OFHAPTIC VIBRATION AND GENERATE CODE
52
CODE
ENCODE AND/OR MODULATE THE CODE FOR TRANSMISSION
TRANSMIT CODE TO REMOTE LOCATION OR RECORD
DECODE AND/OR DEMODULATE
DETECT CODE
54
GENERATE SIMULATED VIBRATION SIGNAL
56
HAPTIC VIBRATION SIGNAL
TRANSDUCER REPRODUCES SENSED HAPTIC VIBRATION
CONVENTIONAL VIDEO SENSING AND COMMUNICATION LINK
CONVENTIONAL AUDIO SENSING AND COMMUNICATION LINK
VIDEO TRANSDUCER (E.G. TV, COMPUTER OR PLAYER)
AUDIO TRANSDUCER (E.G. TV, COMPUTER OR PLAYER)

SENSORS
2
4
6
8
10
12
14
16
1
3
5
7
9
11
13
15
70
72
74
DIVERSITY
76
78
80
DIVERSITY SYSTEM CONTROL CIRCUITRY
86
AUDIENCE AND TRACK MIKES AND PICKUPS
82
16 CHANNEL
10 CHANNEL
84
28 CHANNEL
BK MIX TO COMMERCIAL DISTRIBUTOR FOR 5.1 MIX ENHANCEMENT
88
32 CHANNEL AUDIO MIXER
1-16: HAPTIC SIGNAL SENSORS
17-24 BK MIKES AND PICKUPS
26-32 DISTRIBUTOR FEEDS
COMMERCIAL DISTRIBUTOR AUDIO TRUCK
BK ONLY DISCRETE HAPTIC CHANNEL
BROADCAST/DISTRIBUTION

CAPTURE AND REMOTE REPRODUCTION OF HAPTIC EVENTS IN SYNCHRONOUS ASSOCIATION WITH THE VIDEO AND AUDIO CAPTURE AND REPRODUCTION OF THOSE EVENTS

BACKGROUND OF THE INVENTION

1. Field of the Invention

This invention relates generally to the reproduction of an activity, such as a sporting contest, for a viewer at a remote location and more particularly relates to the reproduction at the remote location, in synchronism with audio and video reproductions of the activity, of those stimuli, or simulations of those stimuli, that are generated by events at the live activity and are perceived by the human tactile sense.

2. Description of the Related Art

There are many entertainment and educational activities that are of interest to viewers who are not in attendance at the activities. Some of the more popular activities of public interest include sporting contests, such as football games and automobile racing, and technological events, such as the launching of a space vehicle. Historically, before the invention of radio and the phonograph, an individual could view or participate in an activity only by personally attending the activity. Radio and the phonograph allowed reproduction of sound so that listeners could perceive, by their sense of hearing at a remote location, the audio generated by the activity. The invention of still photography and later moving pictures allowed reproduction of images of events occurring at an activity so that viewers could perceive, at a remote location, visual images generated by the event. The inventions of sound moving pictures and of television allowed reproduction of moving visible images generated by activities, i.e. the video, in synchronism with the audio that was also generated by events at the activities. Although the video and audio reproductions that are presented at a remote location are not identical to the video and audio generated at the activities, they are approximations that are useful and enjoyable for remote viewers.

Nonetheless, attendance at an activity has continued to provide the most complete and accurate stimuli to the human senses for perception by a viewer. Stimuli that have been omitted from remote reproductions of activities are the haptic stimuli that can be perceived by the human tactile sense. The term haptic means of, based upon, proceeding from or relating to the sensation of touch; tactile. For example, an automobile and its engine operating at an auto race not only generate visual and audible stimuli, but also generate haptic stimuli. Haptic stimuli are those stimuli that are perceived by the human tactile sense. Haptic events are events at activities that generate haptic stimuli in the form of physical motion, particularly vibration. A viewer sitting in the grandstands of such an activity not only sees and hears the automobiles, but often their bodies and the grandstand itself is vibrated by relatively low frequency vibrations which the viewer perceives by the viewer's tactile sense. Although not ordinarily perceived by a viewer in attendance at the activity, the automobile engine also causes vibration of the vehicle which the driver perceives by the driver's tactile sense. As another example, at a football game or a boxing match, haptic events, such as collisions between human bodies and protective equipment, not only generate audio, perceived by a person's ears using the sense of hearing, and generate video, perceived by a person's eyes using the sense of sight, but also generate vibration, that is perceived by at least the participant, even if not perceived by the tactile sense of a viewer. Those vibrations that can be perceived by the human tactile sense are haptic vibrations.

It is a purpose and feature of the invention to enhance the realistic reproduction of an activity for the enhancement of a remote viewer's experience by additionally reproducing, at a remote location and in synchronism with the audio and video, a representation of the haptic vibrations generated by the event and apply them to the body of a remote viewer. These reproduced haptic vibrations can include not only haptic events that can be felt by spectators who are in attendance at an event but not in physical contact with it, but also haptic events that such spectators would not feel but that a participant(s) in the activity would feel.

Another purpose and feature of the invention is to apply to a remote viewer haptic vibrations that are simulations of the haptic stimuli generated by haptic events and apply them in synchronism with video and audio reproductions of the events.

Still another purpose and feature of the invention is to enhance and/or augment sensed haptic stimuli generated by haptic events and apply reproductions of the enhanced stimuli to remote viewers in synchronism with video and audio reproductions of the events.

BRIEF SUMMARY OF THE INVENTION

The invention is directed to methods and apparatus for reproducing and applying to a remote video and audio viewer reproductions of haptic vibrations that occur at a live activity. In synchronism with sensing visible and audible stimuli to generate video and audio signals representing the video and audio at the activity, haptic vibrations of an object at the activity are sensed and converted into a haptic signal. A haptic signal is transmitted to a remote location and/or is recorded and contains information about the timing and characteristic of the sensed haptic vibrations. The haptic signal is separate from the visible and audible signals, i.e. the video and audio. At a location that is remote from the activity, the information is detected and, from the detected information, a reproduction of the sensed haptic vibration signal is generated and applied, in synchronism with reproduction of the sensed video signal and of the sensed audio signal, to an electromechanical transducer that is mechanically connected to a solid object in physical contact with a remote viewer. The transducer is capable of transducing the haptic vibration signal to a representation of the sensed haptic vibration.

BRIEF DESCRIPTION OF THE SEVERAL VIEWS OF THE DRAWINGS

FIG. 1 is a flow chart illustrating an embodiment of the invention.

FIG. 2 is a flow chart illustrating another embodiment of the invention.

FIG. 4 is a flow chart illustrating yet another embodiment of the invention.

Figure 3:
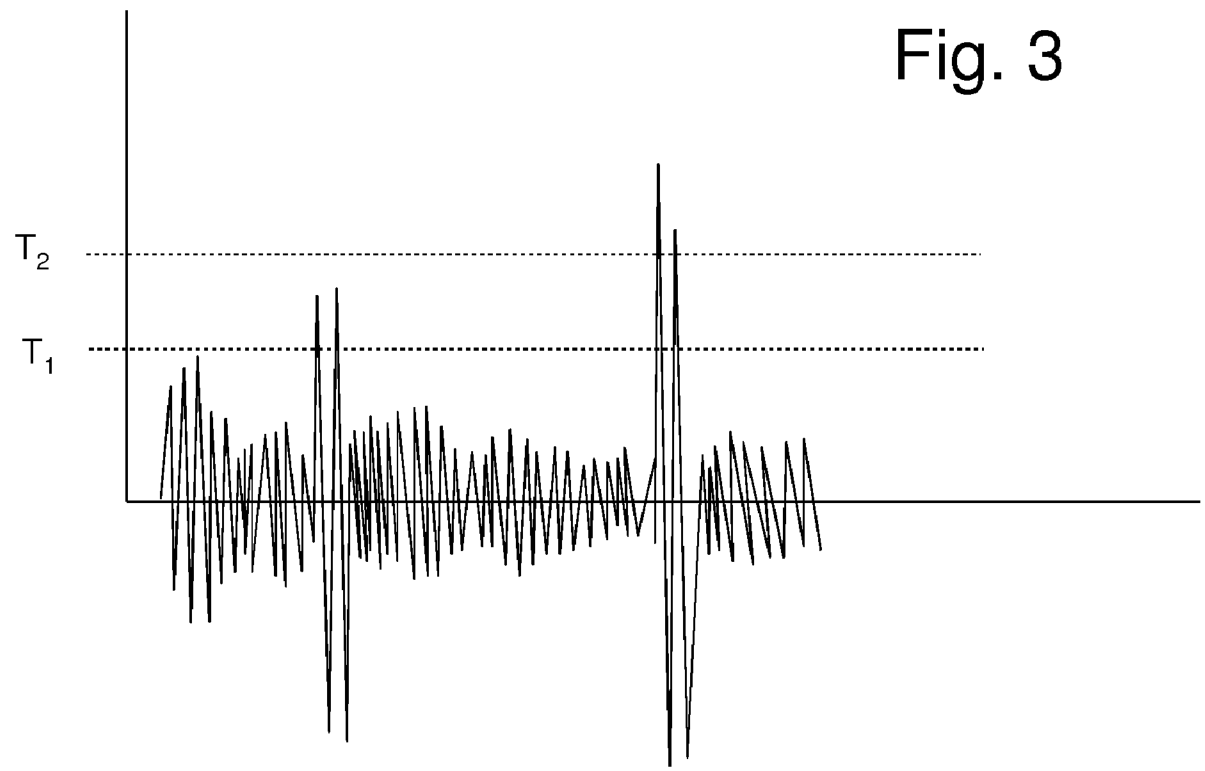
FIG. 3 is an oscillogram further illustrating the embodiment of FIG. 2.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or term similar thereto is often used. They are not limited to direct connection, but include connection through other circuit elements where such connection is recognized as being equivalent by those skilled in the art. In addition, circuits are illustrated which are of a type which perform well known operations on electronic signals. Those skilled in the art will recognize that there are many, and in the future may be additional, alternative circuits which are recognized as equivalent because they provide the same operations on the signals.

DETAILED DESCRIPTION OF THE INVENTION

U.S. Provisional Application No. 60/989,632 filed Nov. 21, 2007 and of U.S. Provisional Application No. 61/055,291 filed May 22, 2008, the above claimed priority applications, are incorporated in this application by reference.

Principles, Definitions and General Description of the Invention

During an activity of interest to spectators and remote viewers, such as a sporting game or competition, physical objects move and those movements are of interest to viewers. The moving objects include people as well as equipment and machines that are associated with the activity and their movements include collisions and vibrations. When a person attends or participates in an activity in person, his or her senses perceive the events that occur during the activity. The senses include: (1) sight—for perception of the visible stimuli generated by the activity and transmitted through the air from the activity to the human eyes; (2) hearing—perception of the audible stimuli generated by the activity and transmitted through the air to the human ears; and (3) tactile sense—the physical motions, including vibrations, that are generated by the event and transmitted both through the air and through physical objects to the human body.

The visible stimuli that stimulate the sense of sight are light waves reflected from and/or generated by the physical objects involved in the activity and transmitted to the spectator's eyes. Stimuli that can be perceived by the hearing sense and the tactile sense result from motion of a physical object that is referred to herein as physical motion or simply motion.

Physical objects can have either or both of two kinds of physical motion: (1) periodic motion and (2) non-periodic motion. Periodic motion is cyclical and is called vibration. Non-periodic motion, such as translation and rotation, is not cyclical. Theoretically, there is not a clear or sharp line of division to distinguish between periodic and non-periodic motion. Fourier analysis reveals that all motion, such as a step function, is the sum of multiple periodic motions. However, for practical purposes, this distinction between periodic and non-periodic motion is a useful distinction because, for non-periodic motion of low acceleration, the amplitude of the Fourier components become so small that they are inconsequential because they can not be felt.

The human body can perceive both periodic motion and non-periodic motion, except for non-periodic motion at an acceleration that is too small to perceive because it applies too small a compression force on human tissue. Periodic motion of a body, which is vibration, can generate two kinds of stimuli that can be perceived by two of the five human senses. Some vibrations generate airborne audible stimuli which are perceived by the human ear. Some vibrations generate haptic stimuli which are perceived by mechanoreceptor cells located principally in the skin and provide the tactile sense. Some vibrations generate both, the audible portion of the energy that is applied to the ear is perceived as audio and the haptic portion of the energy that is applied to the skin is perceived (i.e. felt) as haptic motion such as vibration. The audible vibrations occur over a higher range of frequencies and the haptic vibrations occur over a lower range of frequencies because the human ears and human mechanoreceptor cells are sensitive or responsive to different frequency ranges. But these two frequency ranges overlap.

During activities of interest to attending and remote viewers, various events occur that generate stimuli for the sight, hearing and tactile senses. An event is an occurrence or disturbance that occurs as part of an activity and generates stimuli. Any particular event may generate stimuli for one, two or all three of these senses. For example, an arm waving motion of a football player is an event that may generate only visible stimuli. A referee blowing a whistle may generate both visible and audible stimuli. The motion of a prize fighter's glove colliding with an opponent's body, the vibration of a powerful race car engine or the high speed impact of two football players are events that may generate all three stimuli. Therefore, an event at an activity of interest is a visible event if it can be seen, an audible event if it can be heard and a haptic event if it can be felt. An event can be one or more of these three kinds of events.

To a viewer or participant, whether an event qualifies as any one or more of these three types of events depends upon not only the stimuli generated by the event but also whether stimuli from the event are transmitted to the appropriate human sensing organ that is capable of perceiving the stimuli. Audible vibrations must get to human ears, almost always through air, for an event to be an audible event. Visible light must get to human eyes, almost always carried by air, for an event to be a visible event. Similarly, haptic motion must be transmitted to the human body, apart from the ears, for an event to be perceived as a haptic event.

Haptic vibration can be transmitted to a human body that is present at an activity in two ways: (1) through the air as compressions and rarefactions, as with sound transmission, but the compressions and rarefactions must have a very high amplitude and relatively low frequency at their source (e.g. explosion) to be felt; and (2) through a mechanical link, which has one or more modes of oscillation, to the human body. The mechanical link may be a path though one or multiple connected solid objects. A race car driver can feel road vibration and engine vibration while a spectator in the grandstands may feel only vibrations transmitted through the air to the viewer's body and to the grandstand from the internal explosions in the cylinders vented to the air through the exhaust system. These two vibrations may or may not be similar in form.

So, in summary, haptic motion is motion that generates stimuli that can be perceived by the human tactile sense. Haptic vibration is mechanical vibration that generates vibrotactile stimuli that can be perceived by the human tactile sense. A haptic event is an occurrence or disturbance that generates stimuli that can be perceived by the human tactile sense. Often, haptic events generate and are accompanied by simultaneous visible and audible stimuli including audible vibrations (sound) and visible vibrations (light). The same event often produces all three stimuli. Haptic events include both events that generate periodic vibration that has a relatively long lived fundamental frequency, such as the vibration of an automobile engine, as well as events that generate essentially an impulse and consequently have a relatively short lived fundamental often summed with many harmonics, such as a nearby explosion.

The purpose of an embodiment of the invention is to sense a haptic event with one or more input electromechanical transducers and thereby generate a haptic signal that represents the haptic event and then use that haptic signal to generate a reproduction of the haptic event and apply the reproduction to the human body of a viewer in synchronous association with video and audio of the event. An embodiment of the invention may generate an artificial haptic signal in order to simulate a haptic event. An embodiment of the invention may enhance or augment the haptic signal that represents a haptic event. In sensing a haptic event, fluctuating physical quantities, that produce the haptic vibrations, are converted to an electrical signal which is a haptic signal representing the physical fluctuations of the haptic event, i.e. the haptic vibrations. As known to those skilled in the art, a signal is a fluctuating quantity or impulse whose variations represent information. The amplitude or frequency of voltage, current, electric field strength, light, and sound can be varied as signals representing information. Of course, as also known in the art, the value of a voltage, current or other parameter can also be communicated and stored in the form of digital data and can be processed in a variety of ways. Consequently, a haptic signal, like any other signal, can be communicated or stored in analog or digital form. A haptic signal is a signal that was sensed from a haptic event or was generated to simulate a signal that was sensed from a haptic event and represents the haptic vibration of the event.

After a haptic signal is available, a representation or reproduction of the haptic event is reproduced at a remote location by applying the haptic signal, corresponding to the sensed signal, to an output electromechanical transducer that is mechanically linked to the human body of a remote viewer. For example, a transducer in accordance with U.S. Pat. No. 5,973,422, which is herein incorporated by reference, may be used. In order to reproduce the haptic vibration, the haptic signal, representing the haptic vibrations, must be sensed or a simulated haptic signal must be generated and the haptic signal communicated separately from the audio and video signals. They are separate because the haptic vibrations are applied to a different sensory organ of the human body. They represent what a person would feel, not what a person would hear, if the person were attending or participating in an activity or were in physical contact with the event, such as an earthquake or automobile collision.

Separate. Maintaining the haptic signal separate from the audio and the video signals means that a haptic signal is maintained as a separately identifiable and recoverable signal so it can be used to apply a representation of the original haptic vibration to the output transducer that is mechanically linked to a viewer. The haptic signal can be transmitted or communicated on the same carrier, recorded on the same medium or sent through the same data channel as the audio and/or video. The transmission and/or recording means, protocol or communication system is unimportant, so long as the haptic signal is recoverable for reproduction. The haptic signal retains a separate identity so it can be separated out and detected. For example, the haptic signal can use video metasync technology such as used for closed captioning and subtitles. Although the haptic signal may use the same communication channel as the audio and video or other data or information, the haptic signal is separate in the sense that the haptic signal can be recovered, detected or demodulated and applied to a transducer to reproduce a representation of the original haptic signal. The haptic signal can be recovered by filtering (frequency separation), it can be time or frequency multiplexed, sent through different channels, or sent any of the ways known in the communication art for separately communicating or transmitting a signal including as an analog or digital data signal. Filtering into different frequency bands to recover the haptic signal also can be accomplished by applying a signal the contains both a haptic signal and an audio signal to both an audio transducer and a haptic transducer with the two transducers being responsive to different frequency ranges and thereby separately reproducing the audio and the haptic signals.

Frequency. Haptic vibrations, i.e. vibrotactile stimuli, can be sensed broadly in the range from 0.5 Hz to 800 Hz. However, they are difficult to sense near the upper and lower ends of this range so a more practical range for haptic vibration is about 5 Hz to 100 Hz. Normal hearing perception extends over a frequency range that extends from about 20,000 kHz down to about 20 Hz, although some report a lower limit of 16 Hz. Human hearing sensitivity is best between 1 kHz and 5 kHz. It is apparent that there is an overlap of the broader frequency range of easily perceptible haptic events and the frequencies of audible events. Although the boundaries of these frequency ranges at which perception terminates varies between individuals, there is a remaining frequency range below the lower limit of human hearing in which haptic events can be felt but not heard. That frequency range may be called the sub-audio range.

Reproduction and Representation. The invention of radio permitted sound generated by events to be sensed, transmitted to remote listeners and reproduced. The sounds generated by an event are audible stimuli. The invention of television allowed visible stimuli at an event to also be sensed, transmitted to a remote viewer and reproduced. In each case the audible and visible stimuli generated at the event are not identically reproduced at a remote location. However, a signal representing the audible and visible stimuli is reproduced. The signal that represents the audible and visible stimuli at the event is an approximation of the live audible and visible stimuli. The audio and video signals that represent the audible and visible stimuli are applied respectively to audio and video transducers that convert the electrical signals respectively to audio, that can be perceived by the human ear, and video that can be perceived by the human eye. Consequently, a reproduction or representation approximates the original sensory stimulus; that is, a picture is a representation of a visible event and a sound is a representation of an audible event. A reproduction or representation stimulates the same senses as the original event, but may not (and usually does not) present identical stimuli. A remotely viewed picture isn't identical to the view when in attendance. The reproduced sound may be close but audio engineers and audiophiles know it is not identical to the audible stimuli at the activity. So, a reproduction is a representation that is sensed by the same human senses as the original stimuli that are sensed, but it may be somewhat altered and/or degraded. In any case, a representation or reproduction presents to the remote viewer a picture or sound that is a substitute for the stimuli at the event and is not otherwise available to the remote viewer. These observations are also true of haptic events. Although haptic events are sensed and reproduced in accordance with the invention, the haptic signals that carry an electronic representation of the haptic event may be altered or degraded so that they are not identical to the original haptic vibration. The haptic signals may also be enhanced or modified and may be simulations of haptic signals that would be generated by a haptic event. But the haptic signals are still a representation and a reproduction, even if they are not a perfect or a faithful reproduction.

The invention increases the realism of a reproduction of an event. The haptic signal, whether sensed or simulated and whether or not enhanced, is recorded or transmitted to a location that is remote from the live activity. At a remote location, the haptic signal is applied to an electromechanical transducer that is mechanically connected to a solid object in physical contact with a remote viewer. Most typically the solid object is furniture of some type or style such as a couch or chair. The transducer must be capable of transducing the electrical haptic vibration signal to a representation of the sensed haptic vibration. As a result, a reproduction of the transmitted or recorded haptic vibration signal is applied to a viewer sitting in the piece of furniture or otherwise mechanically linked to the transducer. The haptic signal is applied to the transducer and the haptic vibrations are reproduced in synchronism with reproduction of a sensed video signal and of a sensed audio signal also sensed at the activity at which the haptic events are occurring. In order to reproduce the haptic vibrations in an effective and realistic manner, the haptic signal is maintained separate from the audio and the video signals from the activity.

Mechanically Connected. The output electromechanical transducer that remotely reproduces the haptic vibrations from a live activity is mechanically connected to a solid object in physical contact with the body of a remote viewer. Mechanically connected and physical contact mean that a connection path exists that includes only solids or substantially incompressible fluids. That connection path does not include air. It may be that the same vibration additionally and simultaneously is applied to a transducer that transmits the vibration through the air. But that would be in addition to the invention. In other words, the invention does not require that transmission of the haptic vibration through the air be avoided. But the invention requires that transmission of the haptic vibration include a path through only solids or substantially incompressible fluids. A path of that nature is sometimes also desirable between a sensing transducer and the physical body, the vibration of which is being sensed. Such a path is important to the connection between an output transducer that reproduced the haptic vibrations and the physical body to which an output transducer is mechanically connected.

Synchronism: The invention includes sensing the haptic vibrations of an object in synchronism with sensing visible and audible signals representing the video and audio at the event, and also includes applying a reproduction of the sensed haptic vibration signal to an electromechanical transducer in synchronism with reproduction of the sensed video and of the sensed audio,. This means that the timing of the reproduction of the haptic vibration of a haptic event should substantially coincide with the timing of the video and audio reproduction of the haptic event in order for the haptic reproduction to be associated in the mind of the remote viewer with an event being viewed and possibly heard. For an ordinary live broadcast, any time delays in the delivery of a haptic signal to a viewer should be equal to any time delay of the audio and video signals. Similarly, any recoding and/or reproduction of an activity requires that the haptic signal be recorded so that the video and audio reproduction of video and audio associated with haptic events coincide in time with reproduction of the haptic vibrations of the haptic events. However, the need for synchronism does not mean that video and audio must be sensed and transmitted or recorded by the same person, people or equipment that also sense the haptic signal or otherwise utilize the invention. It means only that, regardless of who or what senses the video and audio, there must be synchronization of the haptic signal with the video and audio signals.

FIG. 1 illustrates a method or process embodying the invention. This process is preceded by identifying and selecting activities that include haptic events of interest to viewers. Positioned at a selected activity are one or more haptic event sensors 10 each of which is a vibration sensor capable of sensing haptic vibrations and transducing them to an electrical haptic signal. The sensors are preferably attached to objects that are part of a selected activity and are likely to be the subject of haptic events. Such objects include, for example, an automobile in a race, a football player, a rocket launch platform or the floor of a prize fight ring. The purpose and processing function 12 of each sensor and its associated conventional circuitry is to sense and capture haptic vibrations and convert them to an electrical haptic vibration signal. As known to those skilled in the art, the conventional circuitry may include, for example, amplifiers, impedance matching circuits, A/D converters, digital signal processors and other data processing circuits.

The preferred sensor is an accelerometer. An accelerometer senses the acceleration of the accelerometer as a result of forces applied to it. These forces include both the initial force of an impact on a body and forces applied by vibrations of the body that were induced by the impact. Particularly preferred are tri-axial accelerometers. A tri-axial accelerometer senses acceleration in all three orthogonal, spatial directions and may provide up to three output channels, one for each direction. Microphones can also be used but need to have a sufficiently low frequency response to sense haptic vibrations.

Preferably, a sensor is mechanically connected to a solid physical object and principally senses the haptic vibrations of that physical object and converts them to an electrical haptic signal that represents the sensed haptic vibration of the object. The sensor may also be mounted to a human body. But the purpose of the sensor is not to sense sound coming through the air but rather to sense the vibrations of the object to which it is attached. Consequently, the manner of attachment of a sensor to a solid physical object, and in particular the mechanical/physical contact between the object and the sensing component of the sensor, should be arranged to effectively couple the vibrations of the object to the sensing component of the sensor. Desirably, sensors are mechanically connected in physical contact with solid inanimate objects for directly sensing the vibration of the objects through their mechanical connection to the objects. It is also desirable to deploy several sensors in order to sense the haptic vibrations of a plurality of objects at the activity and generate a plurality of haptic vibration signals. This allows both the reproduction of many haptic events over a wide area in association and in synchronism with a panoramic video reproduction of the wide area or, alternatively, the selective reproduction of one or a few haptic events in a small area in association and in synchronization with a reproduction of a video close-up.

The signal that is output from the sensor 10 and its associated circuitry contains information for reproducing the waveform of the sensed haptic vibrations. One example of such a signal is an electrical signal that is an analog waveform of the sensed haptic mechanical vibration of an object. Alternatively, the sensed haptic vibration can be converted to a stream of digital data, such as by means of conventional sampling by means of analog to digital conversion.

Step 14 of FIG. 1 is an optional manipulation of the haptic vibration signal and therefore is inserted and illustrated in phantom. In order to enhance the viewer's experience of a haptic vibration, or to compensate for small or diminished sensing amplitude, the amplitude of the haptic signal may be increased, i.e. amplified, relative to the amplitude of audio signals. The amplitude of the haptic vibration signal is increased and the haptic vibrations are later reproduced at a disproportionately larger power than the sensed audio is reproduced for accentuating the sensed haptic vibrations. This is done in order to increase the amplitude of the reproduction of the sensed haptic vibration signal beyond what it otherwise would be.

After sensing the haptic vibration signal at step 12, and optionally after enhancing the haptic vibration signal at step 14, the haptic vibration signal is then applied to a conventional communication link, represented by steps 16, 18 and 20, or recorded so that it is ultimately transferred to a remote location at which a viewer is present. The haptic signal may be encoded and/or modulated, transmitted to the remote location where it is decoded or demodulated in a conventional manner. Since many such communication links for analog and digital signals, and their distribution to interested viewers, are well known in the art, such as the links used by broadcast television, cable and satellite communication, and others that may be developed in the future, the communication link is not described in more detail. The haptic signal is communicated through this communication link or recorded so that it is separate, in the sense described above, from the visible and audible signals, i.e. the audio and video, from the same activity. This communicated haptic signal contains information about the timing and characteristic of the sensed haptic vibrations. Ordinarily, the timing information exists in the form of the timing of the signal. The characteristic information exists in the waveform of an analog signal, the waveform to be reproduced from a digitally encoded waveform or, as described below, simply the amplitude of a sensed haptic vibration. When the haptic signal is recorded, the recording process is substituted for the communication link of steps 18, 20 and 22 but the information is stored on the recording rather than being transmitted through the communication link. Obviously, for commercial tape delayed transmissions, the haptic signal, along with the video and audio signals, may be both recorded and later transmitted through a communication link.

In parallel and simultaneously with the processing of the haptic signal as described above, the audio and the video are conventionally processed by being sensed and transmitted through conventional video and audio sensing and communication links 24 and 26 to the remote location for reproduction at conventional video and audio transducers 28 and 30 positioned at the remote location. Alternatively, conventional video and audio recordings may be made either as a substitute for the transmission or as an interposed step. Any video and audio recordings must be synchronized with the recording of the haptic signal that accompanies the video and audio as described above.

Step 22 of FIG. 1 is another optional manipulation of the haptic vibration signal, like that of step 14, and therefore is inserted and illustrated in phantom. The increase in the amplitude of the haptic vibration signal may be performed at the remote location by step 22 instead of, or alternatively in addition to, increasing the amplitude at step 14 prior to transmitting the haptic signal through the communication link 16, 18 and 20. Of course, when the video, audio and haptic signals are recorded, the signal manipulation of steps 14 and 22 may be performed before or after the recording process, or both.

At step 32, the information in the haptic signal is detected at a location that is remote from the activity, and the detected information is used to reproduce the sensed haptic vibration and apply that vibration to the body of a viewer. This is accomplished by generating and applying a reproduction of the sensed haptic vibration signal to an electromechanical transducer in synchronism with reproduction of the sensed video signal and of the sensed audio signal. That transducer is mechanically connected to a solid, inanimate physical object that is in physical contact with a remote viewer and is capable of transducing the haptic vibration signal to a representation or reproduction of the sensed haptic vibration. The preferred solid, inanimate physical object is a piece of furniture, such as a chair 34, because that is a solid object that is ordinarily directly in mechanical contact with the body of a viewer.

Although the haptic vibration signals, that are sensed and communicated or recorded, can include higher frequencies, it is desirable that they at least include frequencies below 100 Hz. Higher frequencies can be felt by a human viewer but frequencies below 100 Hz are perceived with more intensity and are strongly associated with more exciting haptic events. Frequencies below 100 Hz have a greater psychological impact on a viewer and are commonly present in more powerful haptic events such as collisions of larger masses, explosions or the operation of powerful engines. Frequencies below 30 Hz are important, highly desirable and preferred because those characteristics are especially true of those frequencies. It is also desirable to include sub-audible frequencies, such as below 16 Hz or 20 Hz because the sub-audible frequency range can only be perceived by the tactile sense and, by definition, can not be perceived by the sense of hearing. The lower the frequency range of the vibrations that can be reproduced and applied to a viewer's body, the more enhanced and realistic is the viewer's experience.

FIG. 2 illustrates an embodiment of the invention in which, instead of reproducing the haptic vibration that was captured from a haptic event, a simulated haptic vibration signal is generated in synchronism with an actual haptic event and applied, at a location that is remote from the activity, as a substitute haptic signal to the electromechanical transducer that is mechanically linked to the viewer's body. The transducer thereby applies a reproduction of the simulated haptic vibration signal, in synchronism with reproduction of the sensed video signal and of the sensed audio signal, to the viewer's body. Since the simulated haptic vibration is a simulation of the actual haptic vibration caused by a haptic event for which the video and audio is also captured, a representation or reproduction of the actual haptic vibration, even if only a rough approximation, is sensed and felt by the viewer.

The preferred manner of accomplishing this begins with the preparation and storage of a library of haptic vibration samples. The haptic vibration samples can be recorded from actual haptic events that have occurred at some live activity. Alternatively, haptic vibration samples can be recorded from haptic events that simulate other haptic events. As another alternative, haptic vibration samples can be electronically synthesized. Recording a simulated event would include, for example, the recording of drums being struck or the recording of objects impacting each other. Samples of recordings of the haptic vibrations of a variety of different such haptic events are stored on a recording medium or in a computer data storage device in digital or analog electronic form. Each sample represents and is capable of reproducing a different haptic vibration signal. This process is like the process for recording or synthesizing and storing many different audio samples for electronic musical instruments. These samples are stored in a library of stored haptic vibration signals before broadcast of the video and audio of an activity. The stored samples are then used to generate a haptic vibration signal in synchronism with a haptic vibration that is also the subject of audio and video reproduction for the viewer.

Desirably, multiple sets and subsets of such haptic samples can be generated and stored. For example, there can be a set for football, a set for auto racing around a track and a set for drag racing. Within each set there can be subsets. For example, for auto racing, actual haptic vibrations can be recorded from sensors mounted to a vehicle body, the steering wheel, the grandstands and a driver's helmet. As another example that is particularly applicable to the recording or synthesizing of artificial substitute haptic vibrations, several haptic vibration samples can be stored, each having a different amplitude and, if desired, different harmonic content. One example is the recording of the haptic vibration of a single bass drum, followed by the recording of multiple, different drums each as a different sample. Then, when a haptic event occurs, one, or the mixed sum of multiple stored samples, can be applied to the output transducer. Instead of recording, similar haptic vibrations can be synthesized for the subset in the library and samples stored for use in the same manner that recorded samples are used.

After a library of haptic event simulation samples is assembled and stored, it is then necessary to detect when a haptic event occurs at an activity so a particular sample, or sum of particular samples, of the stored simulated haptic vibrations is selected for application to the output transducer. It is also necessary that the timing of the actual haptic event is sensed so that the simulated haptic vibration can be applied to the viewer in synchronism with the reproduction of the audio and video of that same haptic event. A way to do that is illustrated in FIG. 2 and FIG. 3 and may be called spike sensing.

FIG. 3 is an oscillogram of a segment of the waveform of a signal from a sensor, which can be either a haptic event sensor or an audio sensor. Spike sensing is based upon either: (1) the observation that many, if not most, haptic events an initial short transient impact that has a much higher amplitude than the continued vibration produced by the haptic event; or (2) if a sensor is sensing only haptic events, a major haptic event is usually accompanied by lower amplitude haptic vibrations, which may be considered as background noise. Consequently, electronic circuitry can be employed to sense when the signal amplitude exceeds one or more threshold levels $T_1$ and $T_2$. Consequently, the threshold levels can be used to detect the occurrence of a haptic event and the nature or characteristic of that haptic event. When a threshold is exceeded, a trigger is generated to cause the selection of a stored simulated haptic vibration sample and its application to the output transducer. The amplitude of the highest threshold level that is exceeded can be used to select which one or more samples are selected. For example, if the circuit detects that threshold $T_1$ is exceeded but not threshold $T_2$, one sample, such as a stored bass drum vibration, is selected for reproduction. If threshold $T_2$ is exceeded a different sample is selected and used to generate a haptic vibration signal. Alternatively, if threshold $T_2$ is exceeded, both the sample associated with $T_2$ and the sample associated with $T_1$ can be selected, mixed and applied to the output transducer. Of course several such threshold levels can be used, each threshold being associated with the reproduction of a different selection of one or more samples.

Referring to FIG. 2, a haptic or audio event sensor 40 electronically senses haptic or audible vibrations generated at an activity. At step 42, the occurrence of a haptic event is detected by sensing the amplitude of the vibration signal and, from that amplitude, sensing whether an amplitude threshold was exceeded. If a threshold was exceeded, the highest threshold that was exceeded is detected. All thresholds must be at an amplitude that exceeds the amplitude of any sensed non-haptic, audible background vibration. The exceeded threshold then triggers the selection of its associated, stored, simulated haptic vibration sample or samples. After being selected, the selected sample or samples is then reproduced to generate a simulated vibration signal. The simulated haptic vibration signal must be synchronized with the originally sensed vibration signal that exceeded the threshold so that the haptic vibration is felt by the viewer at the same time the viewer sees and hears the audio and video reproduction of the event that caused the haptic vibrations. Of course the signal processing requires some time to be accomplished. However, the amount of time required by modern signal processing circuitry is so brief that the only synchronization requirement is that the time delay be so brief that it will not be perceived by the viewer. As an alternative, a sensed vibration signal may first be applied to a filter before sensing the signal amplitude. With a filter, any signal frequencies above a selected audible frequency, for example 100 Hz or 30 Hz, can be filtered out. The pass band of such a filter can also be further limited to only sub-audio frequencies.

As described above, this method gives more realistic perceptions to the viewer if a plurality of threshold amplitudes are initially selected and each of the stored simulated vibration signals is associated with a different one of threshold amplitudes. Then, in response to sensing a vibration signal amplitude that exceeds a first threshold but does not exceed the next greater threshold, a stored sample associated with first exceeded threshold is selected for reproduction. Instead of associating each threshold with a single stored simulated haptic vibration in the library, in response to a sensing of a vibration signal amplitude that exceeds the first threshold, multiple stored samples associated with one or more of the thresholds that are less than the first threshold can simultaneously be generated for reproduction and application to the viewer. As illustrated in FIG. 2, after the simulated vibration signal is generated at step 44, it is communicated or recorded and applied to the remote viewer as illustrated and describe above and in connection with FIG. 1.

As a less technically sophisticated alternative to the above haptic event detection using thresholds, the occurrence of a haptic event and the characteristic of that event can be detected manually by a human observing the activity. For example, after the library of simulated haptic vibrations is stored, a human can be provided with a keyboard with multiple keys, each key associated with a different one, or a different group, of the stored samples. Each key triggers the generation of one sample, or a different group of samples, stored in the library of samples. When the human observes a haptic event, the human quickly presses the key that the human judges will generate a haptic vibration that most closely approximates the observed haptic event. This, of course, requires a rapid response but, so long as any time delay is not perceptible to a remote viewer, the haptic vibration applied to the viewer is sufficiently synchronized with the video and audio. If this is done at an activity that is being broadcast live and the broadcast is delayed a few seconds, then the human response can be even more precisely synchronized. Furthermore, if an event is recorded, instead of being broadcast live, the same manual insertion of the simulated haptic vibrations can be accomplished on a post-production basis.

FIG. 4 illustrates an alternative embodiment of the invention which is similar to the embodiment illustrated in FIGS. 2 and 3 but is based upon storing the simulated haptic vibration library at the location of the remote viewer instead of storing it at the live event or at a location interposed between the live event and the place where recording or transmission through a communication link begins. The sensor 50 senses an event in the same manner as described in connection with FIG. 2. At step 52, the occurrence of a haptic event is sensed as described in connection with FIG. 2. However, instead of generating a simulated haptic vibration signal, a code is generated and transmitted to the remote viewer location. The code contains the information identifying the occurrence and characteristic of the haptic event. For example, the signal from the sensor 50 may initially be processed as described above by detecting the amplitude of the signal from the sensor, detecting when it exceeds a threshold and detecting which threshold is the highest threshold that was exceeded. However, instead of immediately generating the simulated haptic vibration signal, a code, for example in the form of digital data such as one byte of data, is separately transmitted through the communication link or recorded. The code may be a numeric value designating the highest threshold that was exceeded or designating a sample or group of samples to be selected for reproduction. Then, at the remote location the code is detected at step 54 and used in the manner described above to select one or more simulated haptic vibration samples that are stored at the remote location. The simulated vibration signal is then generated from the code data at step 56 and initiates the reproduction of the simulated haptic vibration. The transmission through the communication link or recording as well as the reproduction of the video and audio are as previously described.

Signal Distribution. A haptic signal generated in accordance with the invention may be distributed to the viewing public in a variety of alternative ways. After identifying and selecting activities that include haptic events of interest to viewers, vibration sensors are attached to objects that are part of a selected activity. The haptic vibrations from the sensors are captured and used to generate haptic signals from the sensors as described above. The haptic signals are processed in accordance with at least one of the processing sequences described above for electronic distribution separately from the video and audio.

One method of distributing the haptic signals is to distribute the signals over the internet to subscribers in synchronism with a conventional distribution of audio and video signals representing the event by a commercial broadcaster. The video and audio signals are received and reproduced by a remote viewer in the conventional manner. The haptic signals can be distributed over the internet as streaming data and decoded and/or demodulated either in a computer connected to the internet at the remote location or directed to other circuits for doing so. The signal is then applied to an electromechanical transducer that is mechanically connected to a solid object in physical contact with a remote viewer in synchronism with reproduction of the sensed video and audio. Subscriptions can be sold on a per activity basis, for a season or on other known bases.

Alternatively, the distribution channels of an existing audio and video distributor, such as a sports channel or national broadcasting network, can be used. This requires coordinating the hand off, transmission and synchronization of the haptic signal with an existing electronic content distributor, such as an over the air broadcaster, satellite, cable, fiber optic, television, IPTV and internet television. The haptic signal is communicated to the electronic content distributor for simultaneous transmission with audio and video signals also being distributed by the electronic content distributor, including distribution of the audio, video and haptic signals all over a computer network.

As another alternative method of distribution, the haptic signal can be recorded in synchronism with recorded and associated video and audio for later replay reproduction of the haptic vibration signal, in synchronism with reproduction of the sensed video and of the sensed audio, either by post broadcast (prerecorded) or through distribution means such as DVD or video on demand.

Tri-axial alternative. As previously stated, an accelerometer is the preferred sensor and a tri-axial accelerometer is most preferred. Because a tri-axial accelerometer separately and independently senses haptic motion, including vibration, in the directions of three orthogonal axes, three separate and independent haptic vibration signals can be sensed. Two or all three of the three signals can be separately processed in accordance with the methods described above. Instead of a single electromechanical transducer being mechanically connected to a solid, inanimate object, such as a chair, two or three such transducers can be mounted to the inanimate object, each transducer acting along a different one of three orthogonal axes. A different one of the three orthogonal separate haptic vibration signals can be applied to each of two or three such transducers. This applies to the viewer's body two or three different reproduced haptic vibrations along directions corresponding to the sensed vibrations of two or three of the orthogonal directions.

Figure 5:
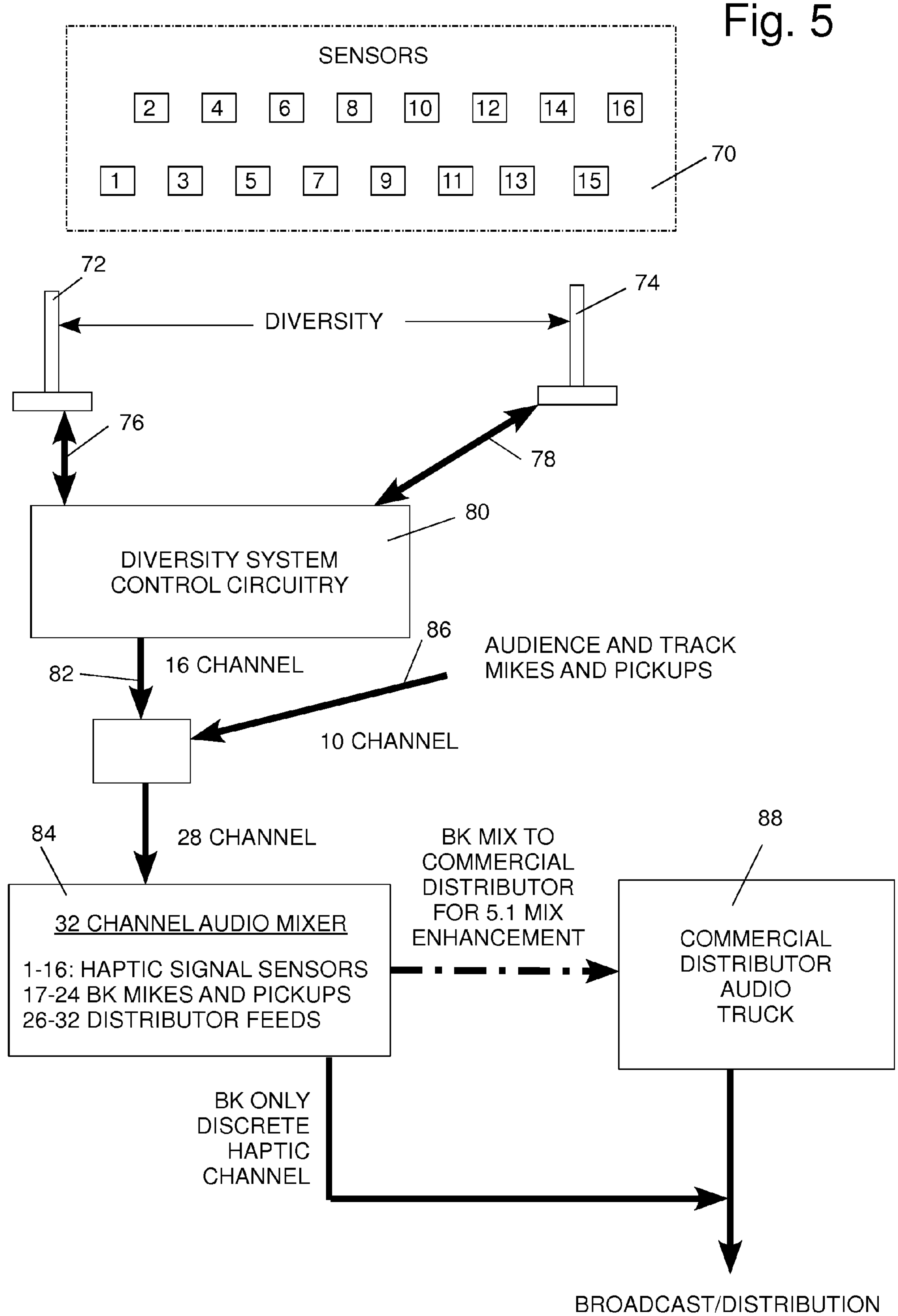
FIG. 5 is a block diagram illustrating an audio and haptic system embodying the invention for sensing and processing the audio and haptic signals in preparation for broadcast.

FIG. 5 is an audio engineer's diagram illustrating an example of the connection, including alternative connections, of existing prior art electronic equipment for practicing the present invention. A group of sensors 70 are preferably accelerometers but they can be microphones if they have a sufficiently low frequency response to sense haptic vibrations. As known to those skilled in the art, microphones can often sense at frequencies that are below the frequency range of their intended use and below the frequency that is communicated to a remote viewer. Outside their nominal pass bands, some microphones can pick up vibrations but their response at those frequencies is considerably diminished in amplitude. However, that signal may be used and amplified for use as the haptic vibration signal in the invention or to detect a haptic vibration and apply one or more haptic signal enhancing techniques.

The sensors 70 communicate by wireless connection in a conventional diversity system through antennas 72 or 74, although there can be more antennas. The antennas 72 and 74 are connected by cables 76 and 78 to a diversity system control 80. In a diversity system, as known in the prior art, the control system 80 selects the signal feed from each sensor to the antenna that provides the best quality signal, usually the one with the highest amplitude and/or least noise, and uses the selected feed as the signal from that sensor. Since 16 sensors are illustrated, that means that 16 individual feeds are applied to an audio mixer 84. Any suitable multi-channel console would work, such as a Yamaha® MG32 mixer. A variety of additional audio input signals, can be supplied optionally by a commercial audio and video distributor and/or the provider of the haptic signals through connection 86 and additionally supplied to the mixer 84.

An audio engineer who is controlling the incoming signals from the sensors 84 then controls the mixing of the signals within the mixer 84 in the manner deemed optimum by the audio engineer to provide the mixed outputs from the mixer 84.

In the illustrated example, regarding one of many possible means by which to produce haptic signal channels, the audio engineer mixes the sensor input signals using multiple channels within the mixer 84, into a single output channel which is then sent to the broadcast audio mixer in the audio truck 88.

The broadcast audio mixer may then add (mix) the haptic track to the standard 0.1 (subwoofer) track, which is then sent out for broadcast.

Another option would be for the haptic channel to be sent directly to the interleaving processor, as a discrete haptic channel, where it would be added to the already finalized video and audio bitstreams, and all three would be coupled together into one broadcast bitstream, with the haptic channel remaining a distinct piece of data which would be coded at the production end and decoded at the consumer end into a haptic analog signal for reproduction with the transducer.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A method for reproducing and applying to a remote video and audio viewer reproductions of haptic vibrations that occur at a live activity, the method comprising:

(a) in synchronism with sensing visible and audible stimuli to generate video and audio signals representing the video and audio at the activity, sensing haptic vibrations of an object at the activity and converting the sensed haptic vibrations into a haptic signal;

(b) transmitting to a remote location or recording a digital or analog haptic signal containing information about the timing and characteristic of the sensed haptic vibrations separately from the visible and audible signals;

(c) at a location that is remote from the activity, detecting said information and from the detected information generating and applying a reproduction of the sensed haptic vibration signal, in synchronism with reproduction of the sensed video signal and of the sensed audio signal, to an electromechanical transducer that is mechanically connected to a solid object in physical contact with a remote viewer and is capable of transducing the haptic vibration signal to a representation of the sensed haptic vibration.

2. A method in accordance with claim 1 wherein the haptic signal contains information for reproducing the waveform of the sensed haptic vibrations of an object at the activity.

3. A method in accordance with claim 2 and further comprising increasing the amplitude of the reproduction of the sensed haptic vibration signal relative to the amplitude of audio signals.

4. A method in accordance with claim 1 wherein the haptic signal is a code derived from the sensed haptic vibrations, the code containing information about the timing and amplitude of the sensed haptic vibrations.

5. A method for reproducing and applying to a remote video and audio viewer reproductions of haptic vibrations that occur at a live activity, the method comprising:

(a) in synchronism with sensing visible and audible stimuli to generate video and audio signals representing the video and audio at the activity, sensing haptic vibrations of an object at the activity to generate a haptic vibration signal that represents the sensed haptic vibration of the object;

(b) transmitting to a remote location or recording the haptic vibration signal separately from the visible and audible signals;

(c) at a location that is remote from the activity, applying a reproduction of the sensed and transmitted or recorded haptic vibration signal, in synchronism with reproduction of the sensed video signal and of the sensed audio signal, to an electromechanical transducer that is mechanically connected to a solid object in physical contact with a remote viewer and is capable of transducing the electrical haptic vibration signal to a representation of the sensed haptic vibration.

6. A method in accordance with claim 5 and further comprising mechanically connecting a vibration sensor in physical contact with a solid inanimate object and directly sensing the vibration of that object through mechanical connection to the object.

7. A method in accordance with claim 6 wherein the haptic vibrations are sensed by sensing acceleration.

8. A method in accordance with claim 5 wherein the applied haptic vibration signal includes vibration frequencies less than 100 Hz.

9. A method in accordance with claim 8 wherein the applied haptic vibration signal includes vibration frequencies less than 30 Hz.

10. A method in accordance with claim 9 wherein the applied haptic vibration signal includes sub-audible vibration frequencies.

11. A method in accordance with claim 5 or 6 or 7 or 8 or 9 or 10 and further comprising increasing the amplitude of the haptic vibration signal and reproducing the haptic vibrations at a disproportionately larger power than the sensed audio is reproduced for accentuating the sensed haptic vibrations.

12. A method in accordance with claim 5 and further comprising selling subscriptions to the separate haptic vibration signal and enabling remote viewer subscribers to demodulate or decode the haptic vibration signal and reproduce the mechanical haptic vibration.

13. A method in accordance with claim 5 wherein the step of sensing haptic vibrations of an object at the activity to generate a haptic vibration signal comprises sensing haptic vibrations of a plurality of objects at the activity to generate a plurality of haptic vibration signals.

14. A method for applying to a remote video and audio viewer reproductions of haptic vibrations that simulate haptic vibrations that occur at a live activity, the method comprising:

(a) in synchronism with sensing visible and audible stimuli to generate video and audio signals representing the video and audio at the activity, generating a simulated haptic vibration signal synchronized with a haptic event at the activity, the simulated haptic signal simulating the vibration of an object at the activity;

(b) transmitting to a remote location or recording the simulated haptic vibration signal separately from the visible and audible signals; and (c) at a location that is remote from the activity, applying a reproduction of the simulated haptic vibration signal, in synchronism with reproduction of the sensed video signal and of the sensed audio signal, to an electromechanical transducer that is mechanically connected to a solid object in physical contact with a remote viewer and is capable of transducing the electrical haptic vibration signal to a representation of the simulated haptic vibrations.

15. A method in accordance with claim 14 wherein the simulated haptic vibration signal is generated, in advance of the live activity, by (a) storing, on a recording medium or a computer data storage device, haptic vibration samples in digital or analog electronic form, each sample representing and capable of reproducing a different haptic vibration signal; and (b) in response to haptic events that occur during the activity, selecting at least one of the stored haptic samples as the simulated haptic vibration signal for reproduction in synchronism with reproduction of the sensed video signal and of the sensed audio signal.

16. A method in accordance with claim 15 wherein the synchronization and sample selection is performed manually.

17. A method in accordance with claim 15 wherein the synchronization and sample selection is performed by (a) electronically sensing haptic or audible vibrations generated at an activity to provide a vibration signal;

(b) sensing the amplitude of the vibration signal;

(c) selecting at least one amplitude threshold at an amplitude exceeding the amplitude of any sensed non-haptic, audible background vibration;

(d) triggering the selection of a stored, simulated haptic vibration sample by, and synchronized with, sensed vibration signals that exceed the selected threshold.

18. A method in accordance with claim 17 and further comprising:

(a) selecting a plurality of threshold amplitudes and associating each of the stored simulated vibration signals to different one of threshold amplitudes;

(b) in response to a sensing of a vibration signal amplitude that exceeds a first threshold but does not exceed the next greater threshold, selecting the stored sample associated with said first threshold.

19. A method in accordance with claim 18 and further comprising, in response to a sensing of a vibration signal amplitude that exceeds a first threshold, selecting multiple stored samples associated with thresholds less than the first threshold.

20. A method for applying to a remote video and audio viewer haptic vibrations that simulate haptic vibrations that occur at a live activity, the method comprising:

(a) detecting the occurrence of a haptic vibration at the live event and generating a code that indicates that occurrence;

(b) transmitting to a remote location or recording the code separately from the visible and audible signals;

(c) in synchronism with video and audio signals representing the video and audio at the activity, generating a simulated haptic vibration signal at a remote location synchronized with a haptic vibration at the activity, the simulated haptic signal simulating the vibration of an object at the activity; and (d) at the remote location, applying a reproduction of the simulated haptic vibration signal, in synchronism with reproduction of the sensed video signal and the sensed audio signal, to an electromechanical transducer that is mechanically connected to a solid object in physical contact with a remote viewer and is capable of transducing the simulated haptic vibration signal to a representation of the simulated haptic vibrations.

21. A method in accordance with claim 20 wherein the simulated haptic vibration signal is generated, in advance of the live activity, by (a) storing at the remote location, on a recording medium or a computer data storage device, haptic vibration samples in digital or analog electronic form, each sample representing and capable of reproducing a different haptic vibration signal; and (b) in response to the code, selecting at least one of the stored haptic samples as the simulated haptic vibration signal for reproduction in synchronism with reproduction of the sensed video signal and of the sensed audio signal.

22. A method in accordance with claim 21 wherein the synchronization and sample selection is performed by (a) electronically sensing haptic or audible vibrations generated at an activity to provide a vibration signal;

(b) selecting at least one amplitude threshold at an amplitude exceeding the amplitude of any sensed non-haptic, audible background vibration;

(c) sensing the amplitude of the vibration signal;

(d) triggering the selection of a stored, simulated haptic vibration sample by, and synchronized with, sensed vibration signals that exceed the selected threshold.

23. A method in accordance with claim 22 and further comprising:

(a) selecting a plurality of threshold amplitudes and associating each of the stored simulated vibration signals to different one of threshold amplitudes;

(b) in response to a sensing of a vibration signal amplitude that exceeds a first threshold but does not exceed the next greater threshold, selecting the stored sample associated with said first threshold.

24. A method in accordance with claim 23 and further comprising, in response to a sensing of a vibration signal amplitude that exceeds a first threshold, selecting multiple stored samples associated with thresholds less than the first threshold.

25. A method for distributing and applying to remote viewers reproductions of haptic vibrations that occur at a live activity, the method comprising:

(a) identifying and selecting activities that include haptic events of interest to viewers;

(b) attaching vibration sensors to objects that are part of a selected activity;

(c) capturing the haptic vibrations from the sensors to generate haptic signals from the sensors; and (d) separately processing the haptic signals for separate electronic distribution.

26. A method in accordance with claim 25 and further comprising: distributing the haptic signals over the internet to subscribers and in synchronism with a distribution of audio and video signals representing the event for applying a reproduction of the haptic vibration signal, in synchronism with reproduction of the sensed video and of the sensed audio, to an electromechanical transducer that is mechanically connected to a solid object in physical contact with a remote viewer and is capable of transducing the electrical haptic vibration signal to a representation of the sensed haptic vibration.

27. A method in accordance with claim 25 and further comprising:

(a) coordinating with an electronic content distributor the hand off of the haptic signal; and (b) communicating the haptic signal to the electronic content distributor for simultaneous transmission with audio and video signals also being distributed by the electronic content distributor for applying a reproduction of the haptic vibration signal, in synchronism with reproduction of the sensed video and of the sensed audio, to an electromechanical transducer that is mechanically connected to a solid object in physical contact with a remote viewer and is capable of transducing the electrical haptic vibration signal to a representation of the sensed haptic vibration.

28. A method in accordance with claim 25 and further comprising:

recording the haptic signal in synchronism with recorded and associated video and audio for later replay, and viewing by applying a reproduction of the haptic vibration signal, in synchronism with reproduction of the sensed video and of the sensed audio, to an electromechanical transducer that is mechanically connected to a solid object in physical contact with a remote viewer and is capable of transducing the electrical haptic vibration signal to a representation of the sensed haptic vibration.

29. An apparatus for reproducing haptic vibrations generated by the vibrations of solid objects at an activity for reproduction and application to a remote viewer who is viewing an audio and video reproduction of the activity, the apparatus comprising:

(a) a vibration sensor capable of sensing haptic vibrations and transducing them to an electrical signal;

(b) a communication link having an input connected to the vibration sensor and an output at a remote location for transmitting to the remote location an electrical signal representing the sensed haptic vibration sensed by the vibration sensor; and (c) an electromechanical transducer capable of transducing and reproducing the electrical signal to physical haptic vibration, the transducer being mounted to a solid physical object that physically contacts the viewer.

30. An apparatus in accordance with claim 29 wherein the sensor is mechanically connected to a solid physical object and senses the haptic vibrations of that physical object.

31. An apparatus in accordance with claim 29 wherein the sensor is mounted to a human.

32. An apparatus in accordance with claim 29 wherein the vibration sensor senses vibration, including vibration below 100 Hz, the communication link communicates electrical signals including below 100 Hz, and frequencies converted to haptic vibrations by the transducer include frequencies below 100 Hz.

33. An apparatus in accordance with claim 32 wherein the vibration sensor senses vibration, including vibration below 30 Hz, the communication link communicates electrical signals including below 30 Hz, and frequencies converted to haptic vibrations by the transducer include frequencies below 30 Hz.

34. An apparatus in accordance with claim 32 wherein the vibration sensor senses vibration, including vibration below 16 Hz, the communication link communicates electrical signals including below 16 Hz, and frequencies converted to haptic vibrations by the transducer include frequencies below 16 Hz.

35. An apparatus in accordance with claim 29 wherein the sensor includes an accelerometer.

36. An apparatus in accordance with claim 35 wherein the sensor includes a triaxial accelerometer.

37. An apparatus in accordance with claim 36 wherein the sensor includes multiple tri-axial accelerometers.

38. An apparatus in accordance with claim 29 wherein the sensor includes multiple sensors.

* * * * *